United States Patent
Wang

(10) Patent No.: US 9,900,345 B2
(45) Date of Patent: Feb. 20, 2018

(54) SAFE INPUT BROWSER, OPERATION METHOD THEREOF, AND COMPUTER SYSTEM HAVING THE SAFE INPUT BROWSER

(71) Applicant: Guide Wang, Hsinchu (TW)

(72) Inventor: Guide Wang, Hsinchu (TW)

( * ) Notice: Subject to any disclaimer, the term of this patent is extended or adjusted under 35 U.S.C. 154(b) by 149 days.

(21) Appl. No.: 14/968,626

(22) Filed: Dec. 14, 2015

(65) Prior Publication Data

US 2016/0173528 A1    Jun. 16, 2016

(30) Foreign Application Priority Data

Dec. 15, 2014  (TW) .............................. 103143628 A

(51) Int. Cl.
*H04L 29/06* (2006.01)
*G06F 21/34* (2013.01)
*G06F 21/60* (2013.01)

(52) U.S. Cl.
CPC .......... *H04L 63/1458* (2013.01); *G06F 21/34* (2013.01); *G06F 21/602* (2013.01); *H04L 63/0272* (2013.01); *H04L 63/0485* (2013.01); *H04L 63/083* (2013.01)

(58) Field of Classification Search
CPC ............. H04L 63/1458; H04L 63/1491; H04L 63/1483; H04L 63/0272; H04L 63/0485; H04L 63/083

USPC .......................... 726/11–15, 22–23; 713/154
See application file for complete search history.

(56) References Cited

U.S. PATENT DOCUMENTS

| | | | | |
|---|---|---|---|---|
| 6,079,020 A | * | 6/2000 | Liu ...................... | H04Q 3/0029 709/223 |
| 7,058,822 B2 | * | 6/2006 | Edery .................... | G06F 21/52 726/22 |
| 7,346,922 B2 | * | 3/2008 | Miliefsky ........... | H04L 63/0272 726/11 |
| 8,850,428 B2 | * | 9/2014 | Dotan .................... | G06F 9/455 711/114 |
| 8,869,235 B2 | * | 10/2014 | Qureshi .................. | H04L 63/20 713/150 |

* cited by examiner

*Primary Examiner* — Hosuk Song

(57) ABSTRACT

The disclosure provides a safe input browser, an operation method thereof, and a computer system having the safe input browser. Upon receiving a command for activating the safe input browser, the pointed site of a specific website is guided to the safe input browser to be linked thereto, so that only web pages of the specific site liked thereto will be shown. Accordingly, users can logon into their frequently used and visited network services to prevent incidents of data theft. Further, the safe input browser supports keyboard inputs with the security encryption function to prevent data from being hacked and side-recorded. It can be further connected to specific sites by a virtual personal network (VPN) or a private line network to prevent attacks of denial of service (DOS) or distributed denial of service (DDOS), thereby facilitating convenience and safety of network transactions.

9 Claims, 3 Drawing Sheets

SAFE INPUT BROWSER, OPERATION METHOD THEREOF, AND COMPUTER SYSTEM HAVING THE SAFE INPUT BROWSER

BACKGROUND OF THE INVENTION

1. Field of the Invention

The present disclosure relates to a safe web page linking mechanism, and, more particularly, to a safe input browser which can link to specific sites, an operation method of the safe input browser, and a computer system having the safe input browser.

2. Description of the Prior Art

With the booming of Internet, more and more trades can be carried out via Internet. The Internet trader can use personal electronic equipment to link to relative web pages for shopping, paying fees, transferring, or the likes, so as to reduce the limitation of time and location, to facilitate the entire convenience of transactions.

More particularly, as long as the trade web sites permit, the transaction is available in any time. If a trader has electronic equipment which can access to Internet, then one can do transactions in any place. However, in spite of high convenience of web trading, for trading websites and traders, the most important issue is still about availability of web service and trading security. Under frequently using of Internet, there are more and more illegal activities spread on Internet, such as fraud, data theft, and so on. For example, a trader will input the account, password, ATM or credit card numbers in transaction. If these information are steal, then we might lose our property, wherein these illegal means including stealing the users' account and password by keyboard capturing and web side-recording, or swindling personal sensitive information by a fake or phishing website, are very common, but hard to be prevented. For example, a phishing website is a fake website whose look and address are almost identical to the legitimate one, so the user will be hard to identify the phishing website is a fake one, resulting in theft of personal sensitive information. The linkage of the fake website can be provided by search engine, an email from forger, or other websites. No matter what, the user may be lack of awareness of the authenticity of the verified link, so phishing is really a threat. Pharming is similar to phishing, but the difference between them is that user cannot identify the authenticity of the website according to the address bar. Since the user browses a website with a legitimate address, the website will be redirected to a phishing website because the local or remote DNS or proxy setting is modified by hacker, however. Therefore, it is very difficult for user to prevent such cyber crimes. With regard to web side-recording, that might side-record all of the data during data transmission. It is hard for user to prevent the Internet hacker activities aforesaid, and these activities also slow down the development of the scope of network transactions.

With regard to sensitive information, such as user account and password, security is an important issue. In addition, attacks of denial of service (DOS) or distributed denial of service (DDOS) is also a big problem. According to a foreign investigation, a website being attacked will cost 1 million dollars on average to deal with the attack, some money is paid for hacker's blackmail, and some is paid for flow cleaning company, namely, renting faster Internet equipment and service to fail the DOS from hackers. However, the flow cleaning service is quite expensive.

Therefore, to find a mechanism for reducing Internet fraud and protecting from DOS or DDOS to let Internet trading can be done smoothly and safely is an important issue for a person skilled in the art.

SUMMARY OF THE INVENTION

In view of the conventional techniques aforesaid, the purpose of the present disclosure is to provide a safe input browser, wherein the safe input browser comprises: a browser connects to a preset website, and has a function for safely inputting an account and password. Also, the browser directly accesses the website through a VPN or a private line network.

To accomplish the above or other purposes, the present disclosure provides a safe input browser linking to a specific address. The address is preset by a programmer when the browser is generated, and the address is unchangeable afterward. The safe input browser can also be designed as a safe input browser which does not link to a specific website but can be preset by a configuration manager or a user. After presetting for linking to a specific website, the browser can link only to the specific website, so as to prevent a user from linking to some fake web sites, such as a phishing web site or the like, resulting in theft of important personal information.

In another embodiment, a safe input browser directly supports inputs with the security encryption function, and the safe input browser has a built-in encrypting keyboard module to prevent keyboard capturing and website side-recording. The module is configured to encrypt input data and decrypt in a remote server, and includes a network transmission safe channel where the user inputs data. After being input, the account and password data will be encrypted immediately. The account and password data is encrypted during whole network transmission through the safe input browser, until a remote server decrypts the user's account and password. Therefore, the user can prevent account and password from being stolen by incidents of data theft, such as keyboard capturing, web side-recording, and so on, so as to conduct a safe transaction by the safe input browser.

In another embodiment, the safe input browser can connect to a specific server by way of a VPN or a private line network to prevent attacks of DOS or DDOS. Because DOS and DDOS generally take advantage of existing defects of an Internet protocol to interrupt user's connection by a huge amount of network flow caused by few zombie computers, the transaction cannot be done smoothly. The VPN and private line network can transmit data through a special Internet protocol, so that a user will not connect through a normal Internet route, and thereby will not be attacked by DOS or DDOS. Building a connection connecting to a specific server through a VPN or a special line can also directly prevent a problem of pharming or web side-recording. Pharming is a cyber attack that redirects a website to a fake one with a true address. With a VPN or private line network, the user's data will not be transcoded or transmitted through the DNS or Proxy server, so that the user will not be redirected to a fake server. During an Internet transmission process, many nodes will be generated, including Router, Gateway, or Proxy server. By connecting through a VPN or a private line network, these nodes can be avoided, thereby preventing the account and password from being stolen by any side-recording software during the transmission. Also, the VPN and private line network aforesaid can be a locally or entirely encrypted network connection, or a physical private line network.

The present disclosure further provides a computer system having the safe input browser aforesaid for executing a specific address linking.

Comparing with the prior art, the safe input browser and operation method thereof and computer system having the safe input browser of the present disclosure can prevent users from their sensitive information being stolen through a phishing website by providing the safe input browser directly connecting to a specific address. The safe input browser of the present disclosure provides an encrypting keyboard module for a user to safely input account and password, and to prevent the account and password from being side-recorded during transmission. Moreover, the present disclosure can further connect to a pre-assigned server of a specific address through a virtual private network or a private line network. Therefore, by application of the safe input browser linking to a specific address, the convenience and safety of Internet trading can have a great improvement.

DETAILED DESCRIPTION OF THE PREFERRED EMBODIMENTS

The following illustrative embodiments are provided to illustrate the present disclosure, these and other advantages and effects can be apparently understood by those in the art after reading the disclosure of this specification. The present disclosure can also be performed or applied by other different embodiments.

Figure 1:
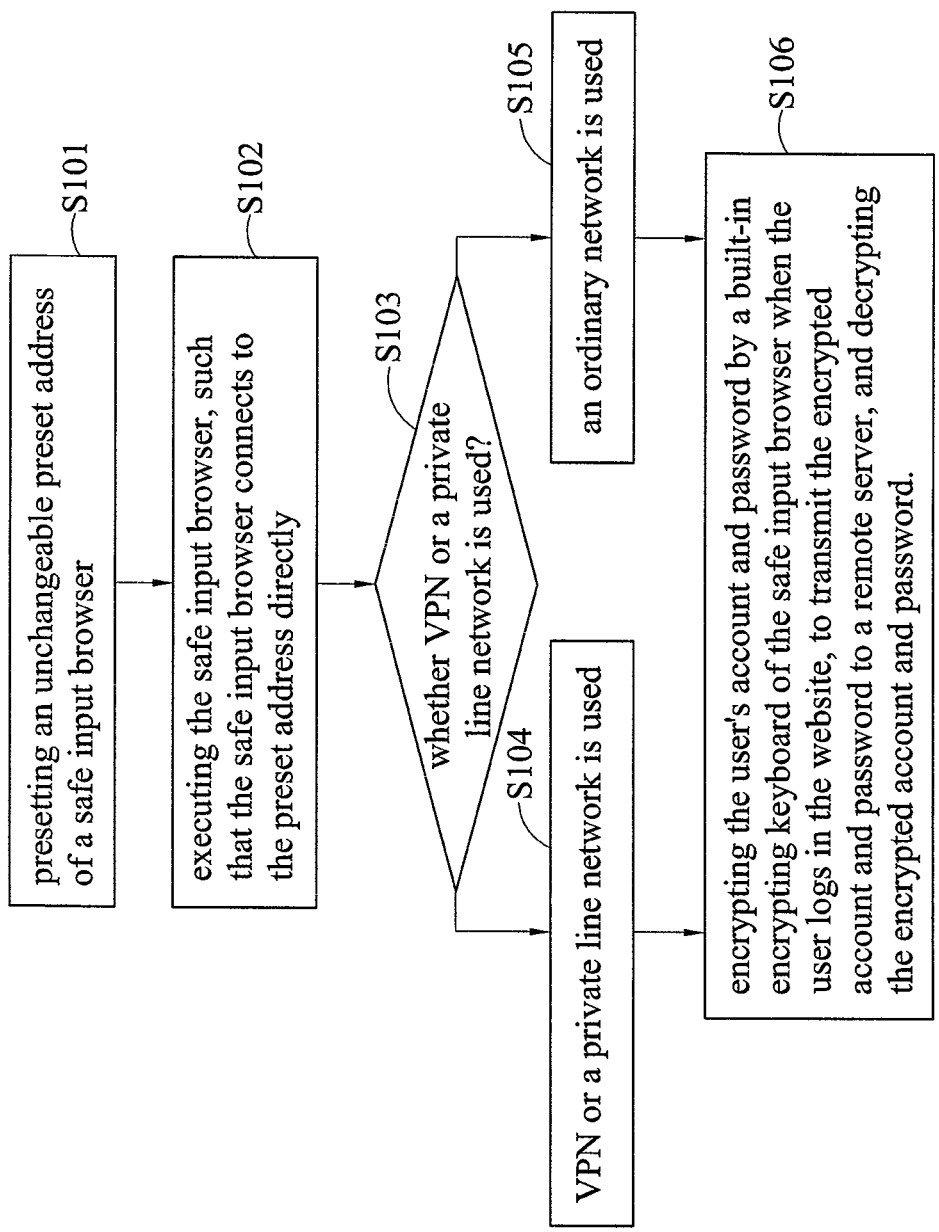
FIG. 1 is a flow chart of the operation method of the safe input browser according to the present disclosure.

FIG. 1 illustrates a flow chart of the operation method of the safe input browser according to the present disclosure. It should be noted that the safe input browser is a browser interface built by executing computer software. The safe input browser is a computer software production which is accomplished by modifying a normal browser engine, and a browser engine is fundamental for executing low level function of browser. For example, IE and Chrome browser have their browser engine individually. With regard to technique of browser engine, that should be familiar to person skilled in the art, so that will not be discussed hereafter.

As shown in FIG. 1, in step S101, a preview address of a safe input browser is preset, and the address is unchangeable. As mentioned above, for preventing user from inputting an improper address, the unchangeable address that is applicable to the website frequently accessed by user is written in the safe input browser of the present disclosure.

Specifically, the address may be an IP address or a domain name. In addition, there are multiple movements for presetting address, comprising: presetting the address in the safe input browser by a software developer when the safe input browser is generating, or after software development, generating a safe input browser which does not have a pre-assigning address, the preset address is preset by a configuration manager or the user, and is unchangeable. Namely, when the safe input browser is executed afterward, the connection will be built and directly linked to the preset address immediately. Next, step S102 is executed.

In step S102, the safe input browser is executed, so the safe input browser will directly connect to the preset address. More particularly, since the safe browser is set to forcibly connect to the preset address, the user can execute the safe input browser when user want to access the website, and the safe input browser can then directly connect to the website of the preset address. Next, step S103 is executed.

In step S103, whether using a VPN or a private line network is determined. To make sure that the date will not be stolen or side-recorded in transmission, in present disclosure, user can choose whether using a VPN or private line network for transmitting data. More particularly, whether using a VPN or private line network is dependent on whether the website can be connected normally that is determined by the safe input browser, so as to determine whether using a VPN or private line network to accomplish the connection.

If the VPN or private line network is chose to be used, step S104 is executed. If not, step S105 is executed. In step S104, the VPN or private line network is used, and in step S105, an ordinary network is used.

No matter the VPN or private line network is used or not, the next step is step S106. In step S106, when user logs in the website, the user's account and password will be encrypted by a built-in encrypting keyboard of the safe input browser, so as to transmit the encrypted account and password to a remote server then decrypting the encrypted account and password. In the step, when user accesses the website, the safe input browser will provide an encrypting keyboard for user to key in account and password, and encrypt the account and password and then transmit it to a remote server then decrypting it. The process can prevent account and password from being intercepted or stolen.

Figure 2:
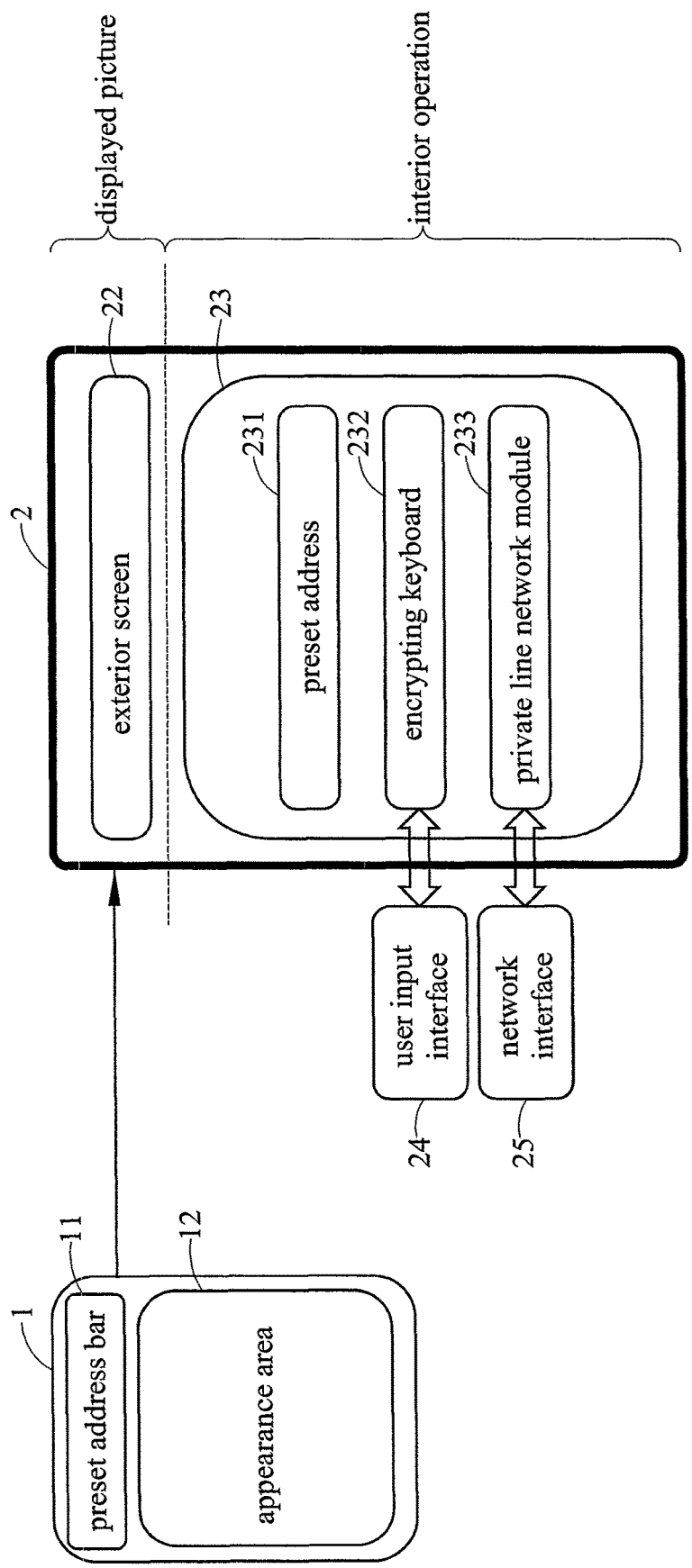
FIG. 2 is a system framework diagram of the safe input browser according to the present disclosure.

FIG. 2 shows a system framework diagram of the safe input browser according to the present disclosure. As shown in left side of FIG. 2, where shows a browser interface 1 which can been seen by user, wherein the browser interface 1 comprises an address bar 11 and an appearance area 12, and the address bar shows the preset address, and the appearance area 12 shows the website content.

Further explaining the internal structure of the safe input browser, as shown in right side of FIG. 2, the safe input browser can be divided into external appearance screen and internal operation. The appearance screen, which is also referred to an exterior screen 22, shows the content that is the same as the content shown by the web site appearance area 12 of the browser interface 1. In addition, the internal operation corresponding to the appearance screen, will be described as follows.

The internal operation system 23 of the safe input browser 2 includes a preset address 231, an encrypting keyboard 232, and a VPN or a private line network module 233.

The preset address 231, which can be saved in a memory, is unchangeable to prevent user form keying in improper address. When the computer system executes the safe input browser 2, the browser can directly connect to the website of the preset address 231.

As mentioned before, the preset address 231 can be an IP address or a domain name, and the preset address 231 is set in the safe input browser 2 during generating the safe input browser 2. Alternatively, after software development, and generating a browser which does not have a preset address, then the address can be set by a configuration manager or user, and the address cannot be changed after setting.

An encrypting keyboard module 232 is used for protecting user's account and password. Namely, when the user logs in the website, the user's account and password will be encrypted and then transmit to a remote server, and further be decrypted by the remote server to prevent the account and password being stolen in transmission.

Moreover, the encrypting keyboard module 232 is connected to a user input interface 24 of the computer system. The user input interface 24 is used for connecting to equipment, such as a keyboard or a mouse, which allow a user to input. After the user input interface 24 receives the data input from the equipment by user, the data will be transmitted to the encrypting keyboard module 232 and then be encrypted.

The VPN or private line network 233 provides user to selectively connect to the website server of the preset address through the VPN or private line network. More particularly, the safe input browser 2 can determine whether using the VPN or private line network to build a connection depending on whether the current website can be connected properly. The VPN or private line network module 233 is connected to a network interface 25 of the computer system for transmitting packets of Internet data.

The VPN or private line network module 233 can provides a safer way for transmission by not adapting a normal Internet address linkage, so DOS or DDOS attacks can be prevented, and pharming and web side-recording problems can also be eliminated directly.

In addition, if the VPN or private line network is adapted for connecting to a remote server, then the transmission data will not be transcoded or transferred through DNS or Proxy server, so the transmission will not be redirected to a fake server when the DNS and Proxy server is hacked, and can prevent side-recording during transmission.

Accordingly, the safe input browser of the present disclosure can prevent the account and password from being stolen resulted form keyboard capturing, screen side-recording, phishing, pharming, or web side-recording, and also prevent DOS or DDOS attacks simultaneously, thereby providing user with a safe web page browsing mechanism.

Figure 3:
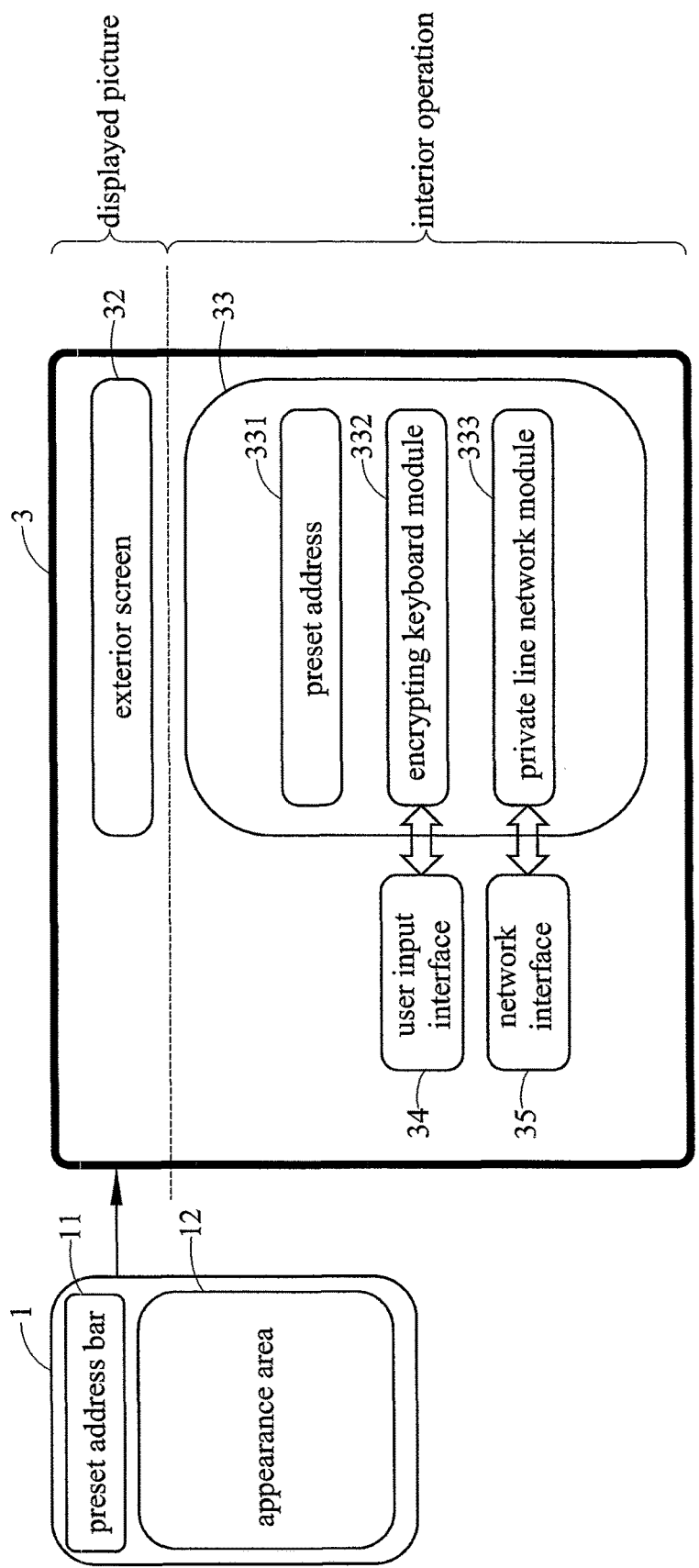
FIG. 3 is a system framework diagram of a computer system having the safe input browser according to the present disclosure.

FIG. 3 illustrates a system framework diagram of a computer system having the safe input browser of the present disclosure. As shown in FIG. 3, the left side of the figure is a browser interface 1 which can be seen by user, and the browser interface 1 comprises an address bar 11 and an appearance area 12. The address bar can show the preset address, and the appearance area 12 can show the web page content.

More particularly, the internal configuration of the computer system having a safe input browser 3 (referring to computer system 3 in following) includes a safe input browser, and the input browser have a preset address unchangeable. And, when the computer system 3 executes the safe input browser, the website of the preset address will be connected directly.

The safe input browser can be divided into an external appearance screen and internal operation. The appearance screen, which is also referred to an exterior screen, shows the content that is the same as the content shown by the webpage appearance area 12 of the browser interface 1. In addition, the internal operation corresponding to the appearance screen will be described as follows in detail.

The internal operation system 33 of the safe input browser 2 includes a preset address 331, an encrypting keyboard module 332, and a VPN or private line network module 333.

The preset address 331, which can be saved in a memory, is unchangeable to prevent user form keying in improper address. When the computer system 3 executes the safe input browser, the website of the preset address 231 will be connected directly.

As mentioned before, the preset address is set in the safe input browser 2 during generating the safe input browser 2. Or, after software development and generating a browser which does not have a preset address, then the address can be set by a configuration manager or user, and the address cannot be changed after setting.

The encrypting keyboard module 332 can encrypt the user's account and password then transmitting the encrypted account and password to a remote server, and the account and password further be decrypted by the remote server, so as to prevent the account and password being stolen in transmission. The encrypting keyboard module 332 is connected to a user input interface 34. After the user input interface 34 receives the data input from the input equipment by user, the data will be transmitted to the encrypting keyboard module 332 and then be encrypted.

The VPN or private line network 333 provides user to selectively connect to a website server of the preset address through the VPN or private line network. More particularly, whether using VPN or private line network for connecting is determined depending on whether the current website can be connected properly. The VPN or private line network module 333 can be connected to a network interface 35 for transmitting packets of Internet data.

By adapting the VPN and private line network, DOS or DDOS attacks can be prevented, and pharming and web side-recording problems can also be avoided. In addition, even when the DNS and Proxy server is hacked, redirecting to a fake server can still be avoid; also, data theft by side-recording in transmission can be prevented simultaneously.

Therefore, by applying the safe input browser, the computer system having the safe input browser 3 can prevent hack activities such as keyboard capturing, screen side-recording, phishing, pharming, web side-recording, and on the likes by hackers. In addition, by using the VPN or private line network, DOS or DDOS attacks can be prevented, thereby providing a safe web page browsing mechanism for users.

Accordingly, the safe input browser and operation method thereof, and computer system having the safe input browser will show an interface on which only shows web pages of specific addresses and the address bar is removed from the interface. Therefore, that can eliminate the possibility of keying in fake an address or malicious address by user. Moreover, the safe input browser connects to specific sites by way of a virtual personal network or a private line network to prevent attacks of DDOS attacks. Therefore, the safe input browser linking to specific websites and application thereof can facilitate the convenience and safety of network transactions.

The present disclosure has been described using exemplary embodiments to illustrate the principles and the effects of the present disclosure, but not intend to limit the present disclosure. The present disclosure without departing from the spirit and scope of the premise can make various changes and modifications by a person skilled in the art. Therefore, the scope of claims of the present disclosure should be defined by the appended claims.

What is claimed is:

1. An operation method of a safe input browser, comprising:
   presetting an unchangeable address previewed by the safe input browser;

executing the safe input browser for the safe input browser to directly connect to the preset unchangeable address; and encrypting a user's account and password by a built-in encryption keyboard of the safe input browser when the user logs in a website, so as to transmit the encrypted account and the encrypted password to a remote server, and decrypting the encrypted account and the encrypted password, wherein presetting the unchangeable address comprises presetting the unchangeable address in the safe input browser by a software developer after the software developer generates the safe input browser free of a pre-assigning address, and wherein the pre-assigning address is set by a configuration manager or the user, and the pre-assigning address is unchangeable, wherein the safe input browser selectively connects to the website by a virtual personal network (VPN) or a private line network to prevent the account and the password from being stolen by a hacker, and prevent attacks of denial of service (DOS) or distributed denial of service (DDOS).

2. The operation method of claim 1, wherein the unchangeable address comprises an IP address or a domain name.

3. The operation method of claim 1, wherein the safe input browser determines whether to use the VPN or the private line network to connect to the website based on whether the website is connected normally.

4. A safe input browser, comprising:
an unchangeable preset address configured for a computer system to directly link to a website of the unchangeable preset address when the computer system executes the safe input browser;
an encrypted keyboard module configured to encrypt a user's account and password when the user logs in the website, so as to transmit the encrypted account and the encrypted password to a remote server, and decrypt the encrypted account and the encrypted password; and
a virtual personal network (VPN) or a private line network configured for the safe input browser to selectively connect to a website server of the unchangeable preset address,
wherein the unchangeable preset address is preset by a software developer after the software developer generates the safe input browser free of a pre-assigning address, and wherein the pre-assigning address is set by a configuration manager or the user, and the pre-assigning address is unchangeable, and wherein the safe input browser prevents the account and the password from being stolen by a hacker, and prevents attacks of denial of service (DOS) or distributed denial of service (DDOS).

5. The safe input browser of claim 4, wherein the unchangeable preset address comprises an IP address or a domain name.

6. The safe input browser of claim 4 being configured to determine whether to use the VPN or the private line network to connect to the website based on whether the website is connected normally.

7. A computer system, comprising:
a safe input browser comprising an unchangeable preset address for the computer system to directly connect to a website of the unchangeable preset address when the computer system executes the safe input browser;
an encrypting keyboard module configured to encrypt a user's account and password when the user logs in the website, so as to transmit the encrypted account and the encrypted password to a remote server, and decrypt the encrypted account and the encrypted password; and
a virtual personal network (VPN) or a private line network configured for the safe input browser to selectively connect to a website server of the unchangeable preset address,
wherein the unchangeable preset address is preset by a software developer after the software developer generates the safe input browser free of a pre-assigning address, and wherein the pre-assigning address is set by a configuration manager or the user, and the pre-assigning address is unchangeable, and
wherein the safe input browser prevents the account and the password from being stolen by a hacker, and prevents attacks of denial of service (DOS) or distributed denial of service (DDOS).

8. The computer system of claim 7, wherein the unchangeable preset address comprises an IP address or a domain name.

9. The computer system of claim 7, wherein the safe input browser determines whether to use the VPN or the private line network to connect to the website based on whether the website is connected normally.

* * * * *